(No Model.)
T. A. EDISON.
Incandescent Electric Lamp.
No. 242,896. Patented June 14, 1881.
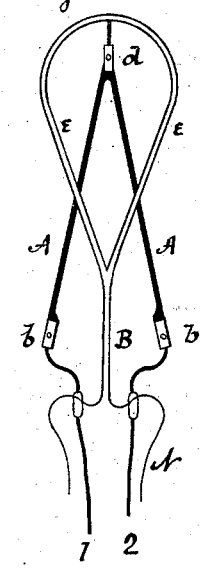
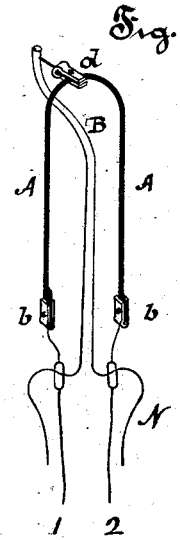
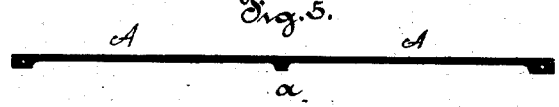
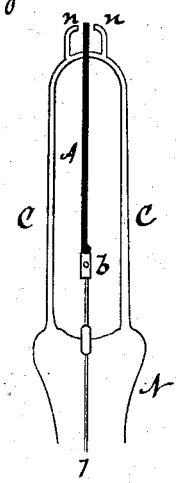
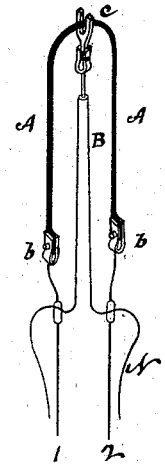
Attest:
D. D. Mott
F. W. Howard
Inventor:
Thos. A. Edison
per Dyer & Wilber
Attys.

UNITED STATES PATENT OFFICE.

THOMAS A. EDISON, OF MENLO PARK, NEW JERSEY.

INCANDESCENT ELECTRIC LAMP.

SPECIFICATION forming part of Letters Patent No. 242,896, dated June 14, 1881.

Application filed December 15 1880. (No model.)

*To all whom it may concern:*

Be it known that I, THOMAS A. EDISON, of Menlo Park, in the county of Middlesex and State of New Jersey, have invented a new and useful Improvement in Incandescent Electric Lamps, (Case No. 269;) and I do hereby declare that the following is a full and exact description of the same, reference being had to the accompanying drawings, and to the letters of reference marked thereon.

In the use of that class of incandescent electric lamps in which the carbon consists of a filament bent into a horseshoe shape and having its ends secured in clamps, difficulty is sometimes experienced from the carbon bending and falling over.

The object of my invention is to obviate this difficulty by constructing a device which will hold the carbon in an upright position; and to this end my invention consists in employing a supporter made of glass or other insulating material, having a support at its upper end, by which the carbon loop is held erect.

In the accompanying drawings, Figures 1, 2, and 3 are front views of different forms of my device; Fig. 4, an edge view of one form, and Fig. 5 a view of a carbon which may be used.

1 2 are the wires passing through the glass N and terminating in the clamps *b*. In each of these clamps is inserted one end of the carbon A A, which is bent into a loop. The glass N is continued upward in the form of a long stem, B, as in Figs. 2 and 3, which has attached to its end a suitable device for holding the carbon erect.

In the form shown in Fig. 2 a projection extends out laterally from near the top of the stem B, and carries the clamp *d*, made of platinum or other suitable metal not easily affected by the current, in which is inserted the loop of the carbon A A at the point *a*. With such construction it is preferable to construct the carbon with an enlarged part, as shown at *a*, Fig. 5, in order to give a larger bearing-surface for the clamp *d*.

In Fig. 3 the stem B is shorter and is not bent, and the projection extends directly upward from its top. The clamp at the end of this projection holds the Y-shaped piece *c*, preferably of platinum, between the prongs of which the carbon loop passes, and is thus kept from falling over sidewise.

In the form shown in Fig. 4 a loop of glass, C C, extends upward, being placed at right angles with the carbon loop. The projections *n n*, extending upward from the glass loop, are arranged one on each side of the carbon, and so keep it from bending or falling. In Fig. 1 the carbon is differently formed, extending up from the clamps in straight lines meeting at *d*. The stem of glass B extends up between the carbons a short distance, and then branches off into a loop, *e e*, which passes around above the point of junction of the carbons, and directly above this point a glass stem projects downward, having on its end the clamp *a*, which holds the ends of the carbons.

What I claim is—

1. The combination, with the incandescing loop of an electric lamp, of a support arranged to maintain the carbon loop in its normal position.

2. The supporting-neck in which the wires leading to the loop are sealed, provided with an arm for maintaining the loop in its normal position, substantially as set forth.

This specification signed and witnessed this 3d day of December, 1880.

THOS. A. EDISON.

Witnesses:
 H. W. SEELY,
 S. D. MOTT.